(12) United States Patent
Lee et al.

(10) Patent No.: US 9,130,224 B2
(45) Date of Patent: *Sep. 8, 2015

(54) BATTERY PACK AND METHOD OF MANUFACTURING BATTERY PACK

(75) Inventors: Seongjoon Lee, Yongin-si (KR); Youngho Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 429 days.

This patent is subject to a terminal disclaimer.

(21) Appl. No.: 12/817,120

(22) Filed: Jun. 16, 2010

(65) Prior Publication Data

US 2011/0003180 A1   Jan. 6, 2011

Related U.S. Application Data

(60) Provisional application No. 61/223,302, filed on Jul. 6, 2009.

(51) Int. Cl.
| | |
|---|---|
| H01M 2/34 | (2006.01) |
| H01M 2/02 | (2006.01) |
| H01M 2/04 | (2006.01) |
| H01M 2/20 | (2006.01) |
| H01M 2/22 | (2006.01) |
| H01M 10/42 | (2006.01) |

(52) U.S. Cl.
CPC ............... *H01M 2/34* (2013.01); *H01M 2/021* (2013.01); *H01M 2/0212* (2013.01); *H01M 2/0215* (2013.01); *H01M 2/0469* (2013.01); *H01M 2/0473* (2013.01); *H01M 2/204* (2013.01); *H01M 2/22* (2013.01); *H01M 10/425* (2013.01); *Y10T 29/4911* (2015.01)

(58) Field of Classification Search
USPC ........................................................... 429/7
See application file for complete search history.

(56) References Cited

U.S. PATENT DOCUMENTS

| | | | | |
|---|---|---|---|---|
| 3,772,089 | A | * | 11/1973 | Bennett et al. ............... 29/623.2 |
| 7,396,600 | B2 | * | 7/2008 | Watanabe et al. ................. 429/7 |
| 7,763,379 | B2 | | 7/2010 | Moon et al. |
| 2002/0114994 | A1 | * | 8/2002 | Yabuki et al. .................. 429/178 |
| 2006/0019160 | A1 | * | 1/2006 | Han .............................. 429/185 |
| 2006/0046139 | A1 | | 3/2006 | Suzuki et al. |

(Continued)

FOREIGN PATENT DOCUMENTS

| | | |
|---|---|---|
| CN | 101069301 A | 11/2007 |
| EP | 1 659 651 A1 | 5/2006 |

(Continued)

OTHER PUBLICATIONS

Jeong et al. (KR 10-2004-0028776) machine translation.*

(Continued)

*Primary Examiner* — Carlos Barcena
*Assistant Examiner* — Wojciech Haske
(74) *Attorney, Agent, or Firm* — Christie, Parker & Hale, LLP

(57) ABSTRACT

A battery pack and a method of manufacturing the battery pack. An embodiment of a battery pack includes: a bare cell including an electrode assembly, a can containing the electrode assembly and having an opening at an end thereof for receiving the electrode assembly, and a cap plate sealing the opening; a protection circuit module for protecting the bare cell during charging; and a lead plate press-fit coupled to the cap plate and electrically connecting the bare cell to the protection circuit module.

18 Claims, 6 Drawing Sheets

(56) References Cited

U.S. PATENT DOCUMENTS

| | | | |
|---|---|---|---|
| 2007/0160878 A1 | 7/2007 | Kim et al. | |
| 2008/0118825 A1* | 5/2008 | Yoon | 429/122 |
| 2009/0087694 A1 | 4/2009 | Park | |
| 2009/0098418 A1* | 4/2009 | Byun et al. | 429/7 |
| 2009/0130554 A1* | 5/2009 | Jang et al. | 429/179 |
| 2009/0246617 A1* | 10/2009 | Howard et al. | 429/161 |

FOREIGN PATENT DOCUMENTS

| | | | |
|---|---|---|---|
| KR | 10-2004-0028776 | * | 10/2005 |
| KR | 10-2005-0103521 | | 10/2005 |
| KR | 10-2005-0113985 | | 12/2005 |
| KR | 10-2006-0050550 | | 5/2006 |
| KR | 10-0647568 B1 | | 11/2006 |
| KR | 2006-0118722 | | 11/2006 |
| KR | 10-2007-0066407 A | | 6/2007 |
| KR | 2007-0101566 | | 10/2007 |
| KR | 10-0791551 B1 | | 12/2007 |
| KR | 10-2008-0032913 A | | 4/2008 |
| KR | 10-0836775 B1 | | 10/2008 |
| KR | 10-2009-0032613 | | 4/2009 |
| KR | 10-2009-0051590 A | | 5/2009 |
| WO | WO 2007/073066 A1 | | 6/2007 |
| WO | WO 2008/050952 A1 | | 5/2008 |
| WO | WO 2008/050955 A1 | | 5/2008 |

OTHER PUBLICATIONS

European Search Report dated Sep. 23, 2010, for corresponding European Patent application 10251214.2, noting listed references in this IDS.

Korean Office action dated Jan. 16, 2012 issued to corresponding Patent Application No. 10-2010-0061019, listing the cited references in this IDS, 8 pages.

KIPO Notice of Allowance dated Aug. 31, 2012, for corresponding Korean Patent application 10-2010-0061019, (5 pages).

EPO Office action dated Mar. 4, 2014, for corresponding European Patent application 10251214.2, (5 pages).

Korean Patent Abstracts of Korean Publication 10-2001-0048099 dated Jun. 15, 2001, corresponding to Korean Patent 10-0647568 listed above.

Korean Patent Abstracts of Korean Publication 10-2007-0074677 dated Jul. 18, 2007, corresponding to Korean Patent 10-0836775 listed above.

SIPO Office action dated Feb. 2, 2012, with English translation, corresponding to Chinese Patent application 200810167379.X, (12 pages).

SIPO Office action dated Oct. 9, 2012, with English translation, corresponding to Chinese Patent application 200810167379.X, (17 pages).

\* cited by examiner

BATTERY PACK AND METHOD OF MANUFACTURING BATTERY PACK

CROSS-REFERENCE TO RELATED APPLICATION

This application claims priority to and the benefit of U.S. Provisional Patent Application No. 61/223,302 filed on Jul. 6, 2009, the entire content of which is incorporated herein by reference.

BACKGROUND

1. Field

Aspects of embodiments of the present invention relate to a battery pack and a method of manufacturing the battery pack.

2. Description of the Related Art

A lithium ion battery pack typically includes a core pack that has a bare cell and a protection circuit module.

The bare cell includes a positive electrode plate, a negative electrode plate, electrolyte, and a separator for applying power to an external electronic device and enabling rechargeability. The protection circuit module protects the battery pack from over-charge and over-current and prevents performance degradation from over-discharge.

The bare cell and the protection circuit module are typically welded to a lead plate having a specific shape formed of metal, so that the bare cell can be electrically connected to the protection circuit module.

SUMMARY

According to an aspect of embodiments of the present invention, a battery pack includes a simple structure connecting a bare cell to a protection circuit module and that is configured to improve coupling strength between the bare cell and the protection circuit module. According to another aspect of embodiments of the present invention, a method of manufacturing a battery pack provides a battery pack including a simple structure connecting a bare cell to a protection circuit module and that is configured to improve coupling strength between the bare cell and the protection circuit module.

According to another aspect of embodiments of the present invention, a battery pack includes a lead plate having a simple L-shaped structure.

According to yet another aspect of embodiments of the present invention, a bare cell may be coupled to a protection circuit module in a simple manner where a recess corresponding to a lower part of the lead plate is formed in a cap plate of the bare cell, and the lead plate is press-fit coupled to the recess.

According to still another aspect of embodiments of the present invention, a portion surrounding the recess of the cap plate may be melted and coupled to the lead plate, thereby improving coupling strength between the bare cell and the lead plate.

According to an exemplary embodiment, a battery pack includes: a bare cell including an electrode assembly, a can containing the electrode assembly and having an opening at an end thereof for receiving the electrode assembly, and a cap plate sealing the opening; a protection circuit module for protecting the bare cell during charging; and a lead plate press-fit coupled to the cap plate and electrically connecting the bare cell to the protection circuit module.

The lead plate may include a first plate coupled to the protection circuit module and a second plate coupled to the cap plate. The first plate may be substantially perpendicular to the second plate. The lead plate may be L-shaped. In one embodiment, the lead plate is T-shaped.

In one embodiment, the cap plate has an outer surface facing the protection circuit module and a recess on the outer surface, and an end portion of the second plate is inserted in and press-fit coupled to the recess. A portion of the cap plate adjacent the recess may be welded to the second plate. In one embodiment, a portion of the cap plate adjacent the recess is resistance welded or seam welded to the second plate such that the portion of the cap plate adjacent the recess or a portion of the second plate is melted and fills a gap between the end portion of the second plate and the cap plate in the recess.

In one embodiment, the end portion of the second plate is coupled to the cap plate at the recess via a conductive material. The conductive material may include an adhesive.

In one embodiment, the first plate is soldered to the protection circuit module.

In one embodiment, the lead plate is press-fit coupled to a first side of the cap plate, and the battery pack further includes another lead plate press-fit coupled to a second side of the cap plate and connecting the bare cell to the protection circuit module, the second side of the cap plate being distal from the first side. The cap plate may have another recess on the outer surface at the second side, and the another lead plate may be press-fit coupled to the another recess. The lead plate and the another lead plate may be positive electrode lead plates. The lead plate may be a positive electrode lead plate and the another lead plate may be a dummy lead plate.

In one embodiment, the protection circuit module has a penetration hole.

In one embodiment, the bare cell further includes an electrode terminal protruding through an aperture in the cap plate and electrically connecting the electrode assembly to the protection circuit module.

According to another exemplary embodiment, a method of manufacturing a battery pack having a bare cell having an electrode assembly and a can containing the electrode assembly and having an opening at an end thereof for receiving the electrode assembly includes: sealing the opening of the can with a cap plate; and electrically connecting a protection circuit module to the bare cell for protecting the bare cell during charging by press-fit coupling a lead plate to the cap plate.

Electrically connecting a protection circuit module to the bare cell may include soldering a first plate of the lead plate to the protection circuit module and press-fit coupling an end portion of a second plate of the lead plate to a recess on an outer surface of the cap plate. Electrically connecting a protection circuit module to the bare cell may further include resistance welding or seam welding a portion of the cap plate adjacent the recess to the second plate such that the portion of the cap plate adjacent the recess or a portion of the second plate is melted and fills a gap between the end portion of the second plate and the cap plate in the recess.

In one embodiment, the method further includes applying a conductive adhesive to a portion of the lead plate that is press-fit coupled to the cap plate.

These and/or other features and aspects of the present invention will become apparent and more readily appreciated from the following description of some exemplary embodiments, taken in conjunction with the accompanying drawings, and from the claims.

DETAILED DESCRIPTION

Figure 1:
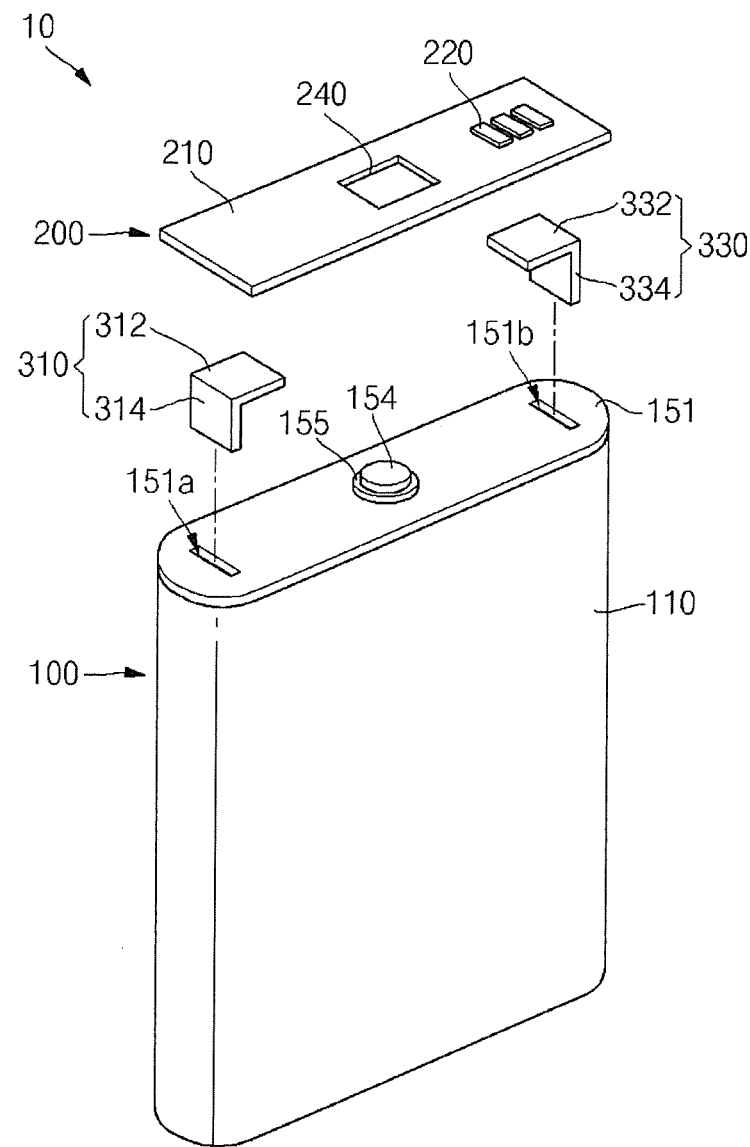
FIG. 1 is an exploded view of a battery pack according to an embodiment of the present invention.

Some exemplary embodiments will now be described more fully hereinafter with reference to the accompanying drawings; however, the present invention may be embodied in different forms and should not be construed as limited to the exemplary embodiments set forth herein. Rather, these exemplary embodiments are provided for reasons of disclosure to convey the scope of the invention to those skilled in the art. Like reference numerals denote like elements throughout.

Hereinafter, a battery pack and a method of manufacturing the battery pack will now be described with reference to the accompanying drawings according to some exemplary embodiments.

Figure 2:
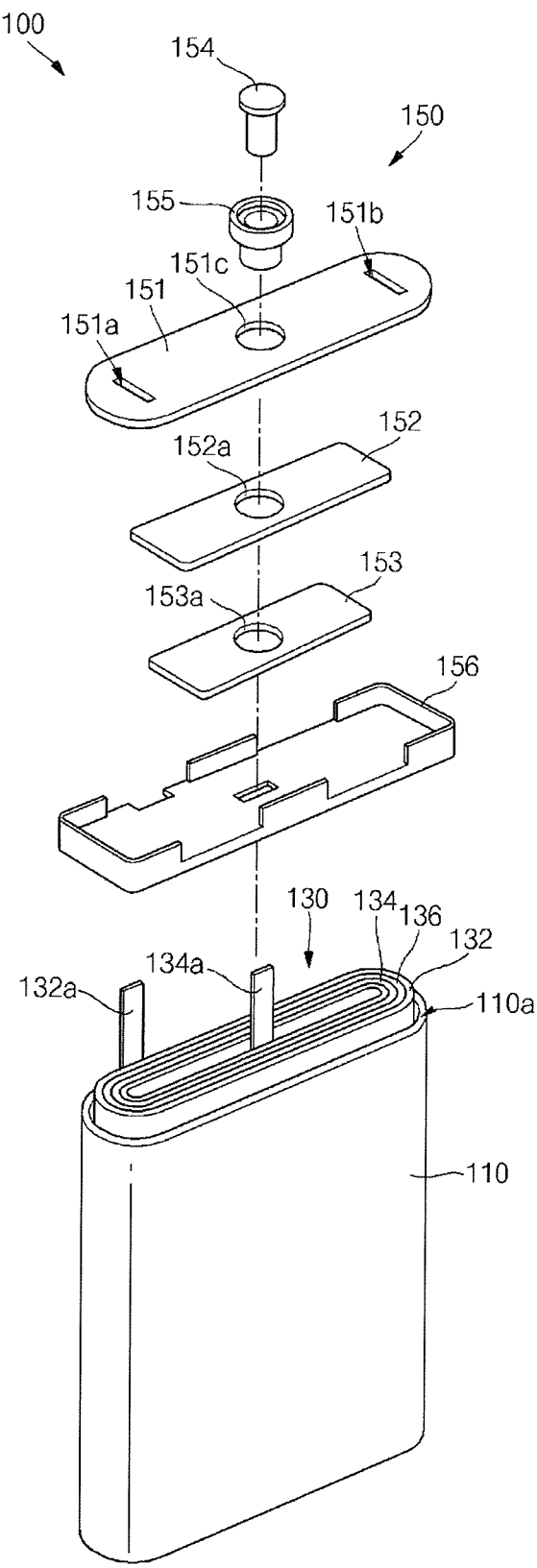
FIG. 2 is an exploded view of a bare cell of a battery pack according to an embodiment of the present invention.
Figure 3:
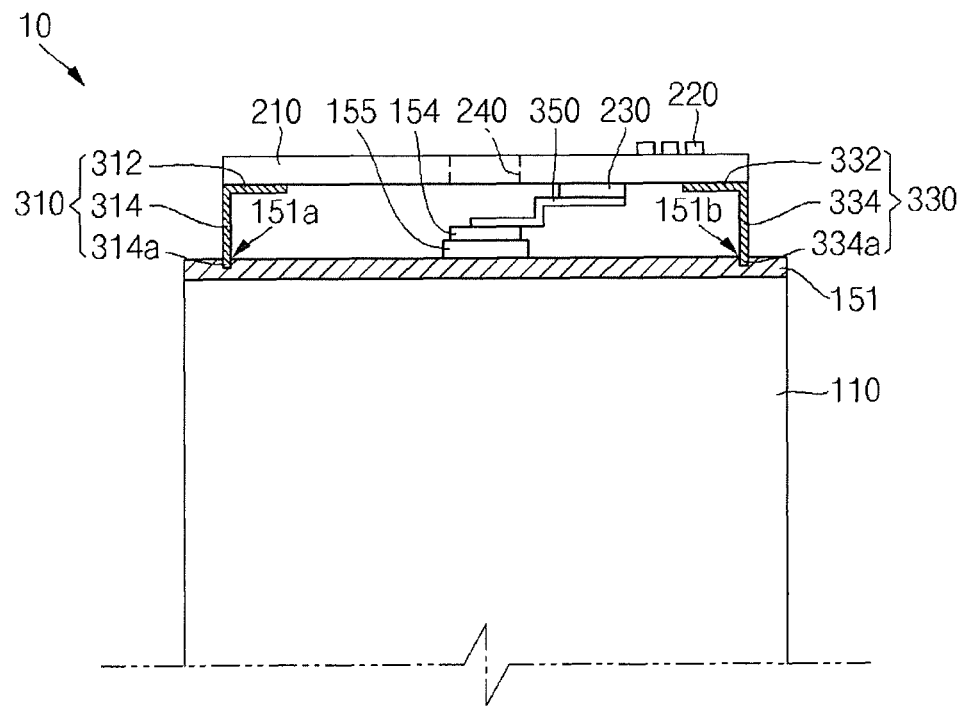
FIG. 3 is a partial front view of the battery pack of FIG. 1.

FIG. 1 is an exploded view of a battery pack according to an embodiment of the present invention. FIG. 2 is an exploded view of a bare cell of a battery pack according to an embodiment of the present invention. FIG. 3 is a partial front view of the battery pack of FIG. 1.

Referring to FIG. 1, a battery pack 10 according to one embodiment of the present invention includes a bare cell 100, a protection circuit module 200, and first and second L-shaped lead plates 310 and 330 electrically and mechanically connecting the bare cell 100 to the protection circuit module 200. In one embodiment, a cap plate 151 of the bare cell 100 includes first and second recesses 151a and 151b at positions respectively corresponding to the first and second lead plates 310 and 330. The recesses 151a and 151b, in one embodiment, have shapes corresponding to the lower parts of the first and second lead plates 310 and 330, and the first and second lead plates 310 and 330 are press-fit coupled to the recesses 151a and 151b of the cap plate 151. In one embodiment, portions of the cap plate 151 surrounding the recesses 151a and 151b are melted and coupled to the first and second lead plates 310 and 330, so as to increase coupling strength of the bare cell 100 and the first and second lead plates 310 and 330.

Referring to FIGS. 1 and 2, the bare cell 100, in one embodiment, includes a can 110, an electrode assembly 130 disposed in the can 110, and a cap assembly 150 closing a top opening 110a of the can 110.

The can 110, having a generally rectangular parallelepiped shape in one embodiment, may have the top opening 110a at a side other than the top. The can 110 may be formed of a metal, or any other suitable material, and function as a terminal. The electrode assembly 130 described later herein may be inserted through the top opening 110a of the can 110.

The electrode assembly 130, in one embodiment, includes a first electrode plate 132, a second electrode plate 134, and a separator 136 that may be wound together in a jelly roll shape.

The separator 136, in one embodiment, is disposed between the first electrode plate 132 and the second electrode plate 134.

The first electrode plate 132 may include a first electrode collector (not shown) and a first electrode coating portion (not shown). A first electrode tab 132a may be attached to a side of the first electrode collector and protrude to the top opening 110a of the can 110.

The second electrode plate 134 may include a second electrode collector (not shown) and a second electrode coating portion (not shown). A second electrode tab 134a may be attached to a side of the second electrode collector and protrude to the top opening 110a of the can 110. The second electrode tab 134a may be made from copper (Cu) or nickel (Ni). In one embodiment, the first electrode plate 132 is a positive electrode, and the second electrode plate 134 is a negative electrode. In another embodiment, the first electrode plate 132 is a negative electrode, and the second electrode plate 134 is a positive electrode. Hereinafter, embodiments of the present invention will be described with reference to the first electrode plate 132 being a positive electrode and the second electrode plate 134 being a negative electrode.

The separator 136 may include a porous film made from polyethylene (PE), polypropylene (PP), a combination thereof, or any other suitable material. The separator 136, disposed in the electrode assembly 130, is configured to prevent or substantially prevent electric conduction between the first electrode plate 132 and the second electrode plate 134 and improve mobility of lithium ions. The separator 136 is further configured to prevent or substantially prevent the first electrode plate 132 from contacting the second electrode plate 134. In addition, if the temperature of the battery pack 10 is increased by an external short circuit, the separator 136 may prevent or substantially prevent further temperature increase of the battery pack 10 through a shut-down operation.

The cap assembly 150, in one embodiment, includes the cap plate 151, an insulation plate 152, a terminal plate 153, an electrode terminal 154, and a gasket 155. The cap assembly 150, in one embodiment, is coupled with an insulation case 156 to the electrode assembly 130 at the top opening 110a of the can 110 to seal the can 110.

A terminal through hole 151c, in one embodiment, is disposed at or near the middle, or at another suitable region, of the cap plate 151. An electrolyte injection hole (not shown) may also be disposed in the cap plate 151. In one embodiment, a safety vent (not shown) is disposed at a surface of the cap plate 151 corresponding to the electrolyte injection hole with respect to the terminal through hole 151c. After electrolyte is injected or otherwise put into the can 110, the electrolyte injection hole may be covered with a cover (not shown), such as a ball. The first electrode tab 132a may be electrically connected to a side of the cap plate 151 corresponding to the first electrode tab 132a. Thus, the cap plate 151 and the can 110 contacting the cap plate 151 may include the positive pole. The cap plate 151, in one embodiment, includes a metal plate having a size corresponding to the top opening 110a of the can 110. In one embodiment, the first and second recesses 151a and 151b, respectively coupled to the first and second lead plates 310 and 330, are disposed at both sides of the cap plate 151. The first and second recesses 151a and 151b will be described later herein in further detail.

The insulation plate 152, in one embodiment, is coupled to a lower surface of the cap plate 151, and is formed of an insulation material, such as an insulative material that forms the gasket 155. The terminal plate 153, in one embodiment, is coupled to a lower surface of the insulation plate 152 and is formed of nickel alloy, or any other suitable material. The insulation plate 152 and the terminal plate 153, in one embodiment, are provided with through holes 152a and 153a, respectively, corresponding to the terminal through hole 151c of the cap plate 151 and at positions corresponding to the terminal through hole 151c of the cap plate 151.

The electrode terminal 154, in one embodiment, is inserted through the terminal through holes 151c, 152a, 153a of the cap plate 151, the insulation plate 152, and the terminal plate 153 and is electrically connected to the second electrode tab 134a of the electrode assembly 130. Thus, the electrode terminal 154 may include the negative pole.

When the electrode terminal 154 is inserted into the terminal through hole 151c of the cap plate 151, the gasket 155 may be disposed between the electrode terminal 154 and the cap plate 151 to insulate the electrode terminal 154 and the cap plate 151 from each other.

With further reference to FIGS. 1 and 3, the protection circuit module 200, in one embodiment, includes a substrate 210, a protection circuit part (not shown), a charge/discharge terminal 220, a positive temperature coefficient (PTC) device 230, the first lead plate 310, the second lead plate 330, and a third lead plate 350. The protection circuit module 200 may include a conductive metal pattern (not shown) on the substrate 210. Additionally, in one embodiment, the protection circuit module 200 has a penetration hole 240 formed through the substrate 210 for facilitating connecting (e.g., by welding) of the third lead plate 350 to the electrode terminal 154.

The protection circuit module 200, in one embodiment, is disposed on the cap plate 151 to protect the bare cell 100 from over-charge and over-current, and to prevent or substantially prevent performance degradation from over-discharge. The protection circuit module 200, in one embodiment, may include the first lead plate 310, the second lead plate 330, and the third lead plate 350, and in another embodiment, may not include one or more of the first lead plate 310, the second lead plate 330, and the third lead plate 350. Hereinafter, the first lead plate 310, the second lead plate 330, and the third lead plate 350 are described separately, or independently, of the protection circuit module 200.

The substrate 210 may include a conductive metal pattern (not shown) mounted thereon, and a plurality of thin substrates stacked thereon. The substrate 210 may be formed of epoxy or Bakelite-based material. The conductive metal pattern may be electrically connected to the protection circuit part, the charge/discharge terminal 220, the first lead plate 310, the second lead plate 330, and the PTC device 230.

The protection circuit part, in one embodiment, is configured to check information about the charge/discharge state, current, voltage, and temperature of a battery to protect the battery.

The charge/discharge terminal 220 is electrically connected to the protection circuit part and the conductive metal pattern to electrically communicate with an external device.

The PTC device 230, in one embodiment, is disposed under the substrate 210 and is electrically connected to the electrode terminal 154 of the bare cell 100 through the third lead plate 350. The PTC device 230, in one embodiment, is configured such that when the temperature of the battery pack 10 is greater than a reference temperature (e.g., a critical temperature), the electrical resistance of the PTC device 230 becomes infinite. Thus, when the temperature of the battery pack 10 is greater than the reference temperature, the PTC device 230 limits a charge/discharge current of the battery pack 10.

The first and second lead plates 310 and 330, respectively disposed on both lower sides of the substrate 210 in one embodiment, electrically and mechanically connect the cap plate 151 of the bare cell 100 to the protection circuit module 200. The first and second lead plates 310 and 330, in one embodiment, are positive electrode lead plates. In this case, the first and second lead plates 310 and 330 electrically connect the bare cell 100 to the protection circuit module 200. Alternatively, one of the first and second lead plates 310 and 330 may be a positive electrode lead plate, and the other may be a dummy lead plate. In this case, the dummy lead plate spaces the bare cell 100 apart from the protection circuit module 200 without electrically connecting the bare cell 100 to the protection circuit module 200. Hereinafter, the first and second lead plates 310 and 330 are described as being positive electrode lead plates. However, in the embodiment where only one of the first and second lead plates 310 and 330 is a positive electrode lead plate, a dummy lead plate may have the same configuration as the positive electrode lead plate except that the dummy lead plate is not electrically connected to the conductive metal pattern of the protection circuit module 200.

In one embodiment, the first lead plate 310 includes a first plate 312 and a second plate 314, and the second lead plate 330 includes a first plate 332 and a second plate 334. In one embodiment, the first plate 312 of the first lead plate 310 is soldered to one side of the protection circuit module 200, and the second plate 314 is connected to one side of the first plate 312 and electrically connected to one side of the cap plate 151. Similarly, the first plate 332 of the second lead plate 330 may be soldered to one side of the protection circuit module 200, and the second plate 334 may be connected to one side of the first plate 332 and electrically connected to one side of the cap plate 151. In more detail, the first plates 312 and 332 and the second plates 314 and 334, in one embodiment, may be formed as tetragonal flat plates, and the second plates 314 and 334 may be bent or otherwise extended toward the bare cell 100 perpendicular or substantially perpendicular to the first plates 312 and 332. The lower parts of the second plates 314 and 334 are respectively coupled to the first and second recesses 151a and 151b of the cap plate 151 which correspond to the lower parts of the second plates 314 and 334. That is, in one embodiment, the lower part of the second plate 314 of the first lead plate 310 is a first coupling part 314a, and the lower part of the second plate 334 of the second lead plate 330 is a second coupling part 334a. The first plates 312 and 332 and the second plates 314 and 334, in one embodiment, are formed of a metal, such as nickel or nickel alloy, but alternatively, may be formed of any other suitable metal or other material.

The third lead plate 350, in one embodiment, electrically connects the electrode terminal 154 disposed over the bare cell 100 to the PTC device 230 disposed under the protection circuit module 200. The third lead plate 350 may be a negative electrode lead plate.

Hereinafter, the coupling of the first and second lead plates 310 and 330 to the cap plate 151 will be described in further detail. The coupling of the first lead plate 310 and the first recess 151a may be the same or substantially similar to that of the second lead plate 330 and the second recess 151b. Therefore, the coupling of the first lead plate 310 to the first recess 151a will now be representatively described, and the coupling of the second lead plate 330 to the second recess 151b will be omitted.

Figure 4:
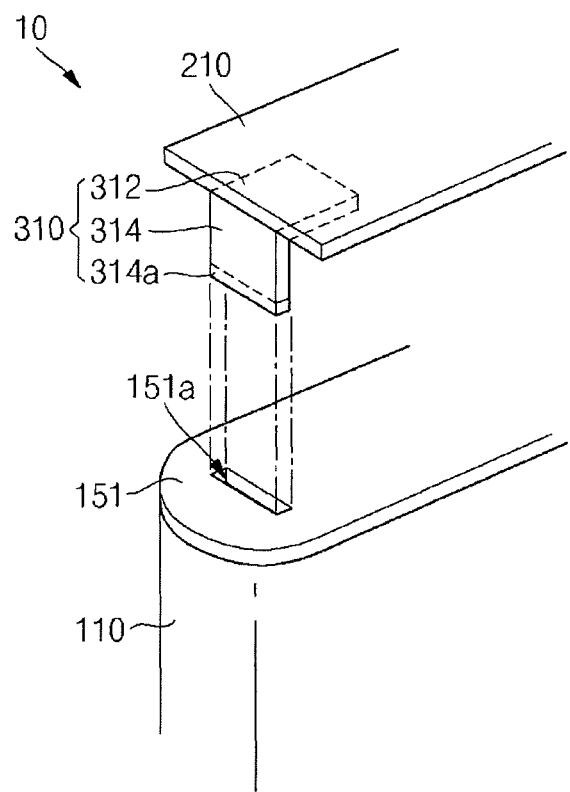
FIG. 4 is an enlarged partial perspective view of the battery pack of FIG. 1.

FIG. 4 is a partial enlarged perspective view of the battery pack of FIG. 1.

Referring to FIG. 4, the first lead plate 310 of the battery pack 10, in one embodiment, includes the first plate 312 electrically connected to one side of the lower surface of the substrate 210 of the protection circuit module 200, and the second plate 314 connected to one side of the first plate 312 and electrically connected to one side of the cap plate 151. In particular, the first and second plates 312 and 314 may have tetragonal flat plate shapes, and the second plate 314 may be bent or otherwise extended toward the bare cell 100 to be perpendicular or substantially perpendicular to the first plate 312.

The first lead plate 310, as described above, has a simple structure for connecting the protection circuit module 200 to the bare cell 100. In particular, since the number of plates constituting the first lead plate 310 is only two, the first lead plate 310 has a simple structure. Thus, manufacturing of the first lead plate 310 is easy, and the protection circuit module 200 is coupled to the bare cell 100 utilizing a simple structure. However, the present invention is not limited to embodiments in which a first lead plate and a second lead plate each consist of two plates, but alternatively, may encompass embodiments in which one or more of the lead plates is formed of a single plate or includes three or more plates.

The first recess 151a may be disposed at one side of the cap plate 151 and, in one embodiment, has a shape corresponding to the lower part of the second plate 314, that is, to the first coupling part 314a. In one embodiment, the first recess 151a may have a generally rectangular parallelepiped shape in a three-dimensional view and a rectangular shape in a two dimensional view. The first coupling part 314a of the first lead plate 310, in one embodiment, is mechanically and electrically connected to the first recess 151a of the cap plate 151 through press-fit coupling. As such, the length and width of the first coupling part 314a, in one embodiment, correspond to those of the first recess 151a, and the first coupling part 314a is press-fit coupled into the first recess 151a. The frictional force due to the press-fit coupling prevents or substantially prevents the first coupling part 314a from being removed from the first recess 151a.

The press-fit coupling of the first coupling part 314a in the first recess 151a and the second coupling part 334a in the second recess 151b may substitute for or supplement the lead plates being coupled to a cap plate through laser welding or other methods or configurations wherein a jig may be needed to remove a gap between the upper surface of the cap plate and the lead plate. Further, embodiments of the present invention may reduce or prevent the protection circuit module from being broken by the pressure of the jig, a welding part of the lead plate being spaced apart from the cap plate to cause welding defects, and/or alignment issues or other difficulties caused by welding.

In the battery pack 10, when the protection circuit module 200 is coupled to the bare cell 100, the first and second lead plates 310 and 330, having simple structures, are press-fit coupled to the bare cell 100. Accordingly, a jig pressing process is not required, resulting in a simple and efficient manufacturing process. Also, because a welding process that may cause defects may be removed or replaced with a reliable welding process, manufacturing costs can be reduced, and productivity can be improved.

The first coupling part 314a may be coupled to the first recess 151a through conductive adhesive that improves electrical conductivity between the cap plate 151 and the first lead plate 310 to reduce electrical resistance between the bare cell 100 and the protection circuit module 200 and that improves mechanical coupling between the first lead plate 310 and the cap plate 151. That is, in one embodiment, a conductive adhesive, or alternatively a non-conductive adhesive, may be applied between the first coupling part 314a and the first recess 151a to improve mechanical coupling strength (e.g., together with the press-fit coupling described above) and/or to reduce electrical resistance. Similarly, the second coupling part 334a may be coupled to the second recess 151b utilizing a conductive adhesive. The conductive adhesive may be AL30FR manufactured by 3M or any other suitable adhesive, and may have a thickness of 0.08 mm or any other suitable thickness.

Figure 5:
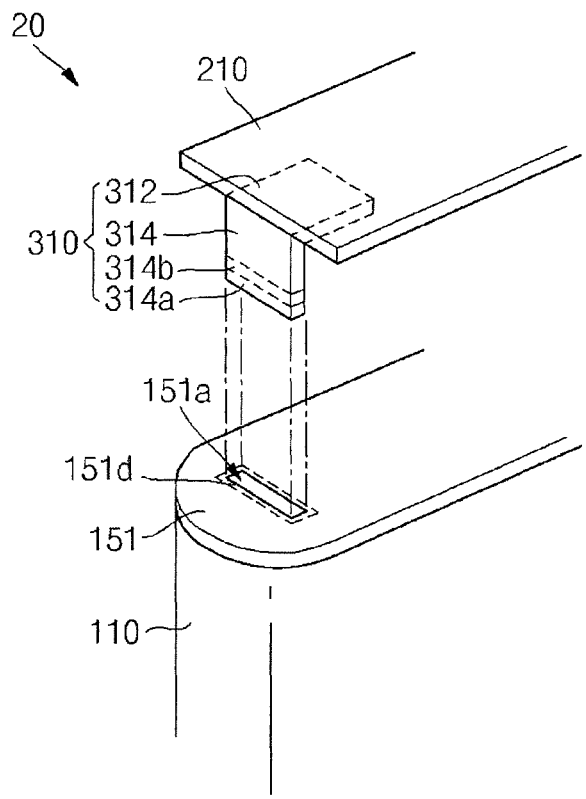
FIGS. 5 and 6 are enlarged partial perspective views of a battery pack according to another embodiment of the present invention.
Figure 6:
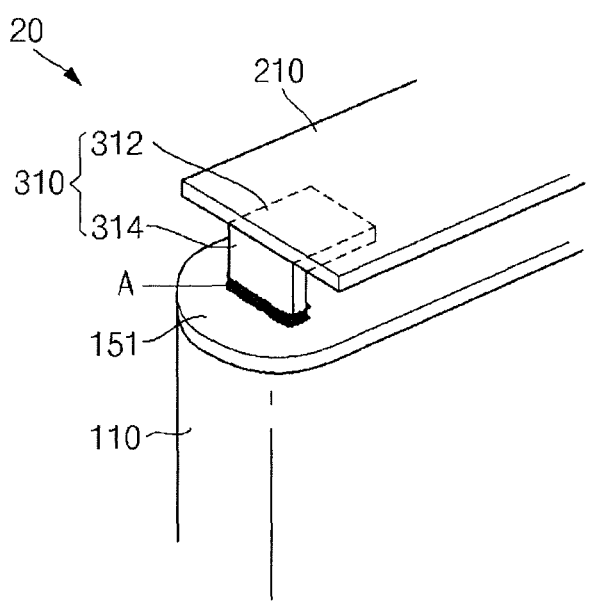

FIGS. 5 and 6 are enlarged partial perspective views of a battery pack according to another embodiment of the present invention.

Referring to FIGS. 5 and 6, a battery pack 20 according to one embodiment of the present invention is the same or similar to the battery pack 10 described above except that the first lead plate 310 is press-fit coupled to the first recess 151a, and additionally, a portion 151d of the cap plate 151 around or surrounding the first recess 151a is melted and welded to the first lead plate 310. Therefore, only the difference between the battery pack 20 and the battery pack 10 will now be described in further detail, and other aspects of the above-described battery pack 10 will not be described again herein. Furthermore, the coupling of the second lead plate 330 and the second recess 151b in the battery pack 20 may be the same or substantially similar to that of the first lead plate 310 and the first recess 151a. Therefore, the coupling of the first lead plate 310 to the first recess 151a will now be representatively described, and the coupling of the second lead plate 330 to the second recess 151b will be omitted.

In the battery pack 20, the first coupling part 314a of the first lead plate 310 may be press-fit coupled to the first recess 151a, as described in the previous embodiments. Thereafter, in one embodiment, a current is applied to the portion 151d of the cap plate 151 to melt the portion 151d, and the cap plate 151 is welded to the second plate 314 through resistance welding, and particularly, through seam welding. In seam welding, a current is briefly applied to a region to be welded, and the resistance heat of a contact melts the region to be welded. At this point, a seam is continuously formed in the region to be welded.

Referring again to FIGS. 5 and 6, when a strong current is applied to the portion 151d of the cap plate 151 or to an upper portion 314b of the first coupling part 314a of the second plate 314, the portion 151d is melted and welded to the upper portion 314b of the first coupling part 314a of the second plate 314, or the upper portion 314b of the first coupling part 314a is melted and welded to the portion 151d, thereby improving the coupling strength between the first lead plate 310 and the cap plate 151. At this point, a melted portion of the portion 151d or the upper portion 314b of the first coupling part 314a fills a gap between the first recess 151a and the first coupling part 314a coupled to the first recess 151a, thereby further improving the coupling strength between the first lead plate 310 and the cap plate 151. In FIG. 6, a region A denotes a welded region between the first lead plate 310 and the cap plate 151.

Figure 7:
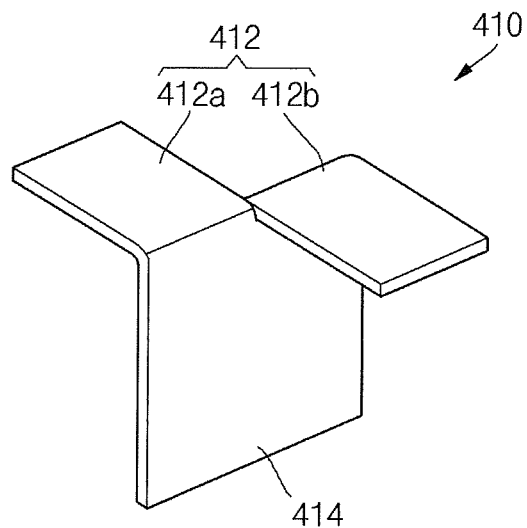
FIG. 7 is a perspective view of a lead plate of a battery pack according to another embodiment of the present invention.

FIG. 7 shows a lead plate 410 of a battery pack according to another embodiment of the present invention. As with the lead plate 310 described above, the lead plate 410 may be used in combination with one or more lead plates having a different configuration or as one of a pair, wherein the other lead plate has the same configuration.

The lead plate 410 differs from the lead plates of the previous embodiments in that it has a substantially T-shaped profile. In one embodiment, the stem of the "T" is formed by a second plate 414 having substantially the same configuration as that of the second plate 314 described above. The second plate 414, in one embodiment, engages with a recess 151a, 151b of the cap plate 151 in the same manner as described above with respect to the lead plate 310 and, therefore, a description thereof will not be repeated.

In one embodiment, the cross-bar of the "T" is defined by two sub-plates 412a and 412b. The sub-plates are formed by dividing a first plate 412 of the lead plate 410 in half and bending the two halves in opposite directions.

The first plate 412 of the lead plate 410 functions as a support portion in the same manner as described above with respect to the lead plate 310. Further, in one embodiment, the first plate 412 is soldered to the side of the protection circuit module 200 that faces the bare cell 100 in a similar or same manner as in the above-described embodiments, although the distribution of the solder will be different to take account of the different shape offered by the surface area of the lead plate 412.

Figure 8:
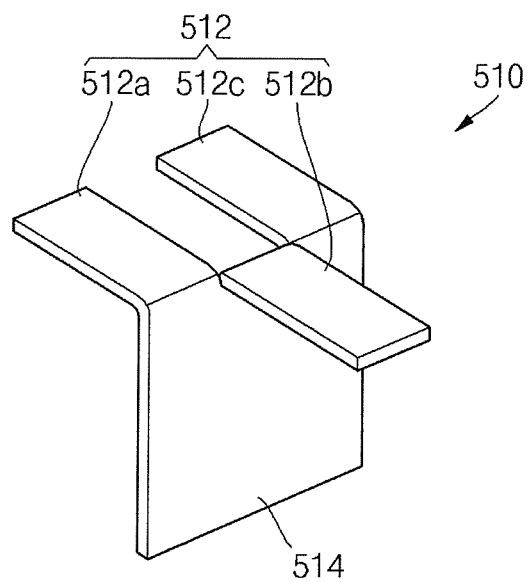
FIG. 8 is a perspective view of a lead plate of a battery pack according to another embodiment of the present invention.

FIG. 8 shows a lead plate 510 according to another embodiment of the present invention. The lead plate 510 is similar to the lead plate 410 shown in FIG. 7, but the cross-bar of the "T" is, in one embodiment, formed by three sub-plates 512a, 512b, and 512c extending from a second plate 514. These sub-plates are formed, in one embodiment, by dividing the first plate 512 using two cuts and then bending the first and third sub-plates 512a, 512c in one direction, and bending the second sub-plate 512b in an opposite direction. The lead plate 510 may, like in other embodiments, be used with differently configured lead plates, or as one of a matching pair. Further, the lead plate 510 may be connected to the protection circuit module 200 and the bare cell 100 in the same manner as the lead plate 410 shown in FIG. 7.

Figure 9:
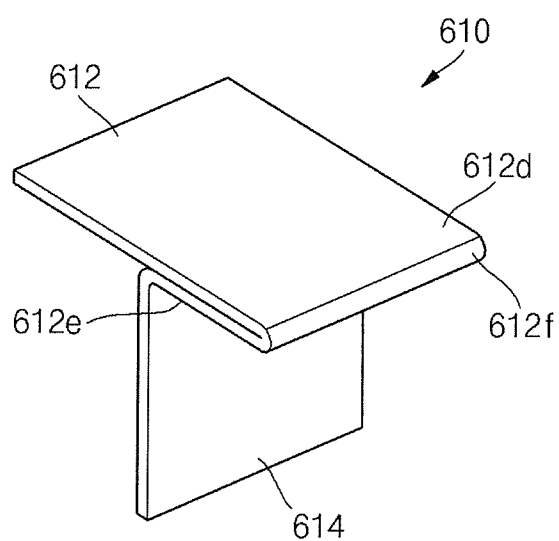
FIG. 9 is a perspective view of a lead plate of a battery pack according to another embodiment of the present invention.

FIG. 9 shows a lead plate 610 according to another embodiment of the present invention. The lead plate 610 is similar to the lead plates 410 and 510 shown in FIGS. 7 and 8 in that it has a T-shaped profile. A second plate 614, in one embodiment, is the same as that of the lead plates 410 and 510 and is attached to the cap plate 151 in the same manner as that of the lead plates 410 and 510 and, therefore, a description thereof will not be repeated.

The cross member of the "T" of the lead plate 610 is formed by a first plate 612 that is formed by using two bends. In one embodiment, the lead plate material is bent 90° toward a first direction (e.g., the right side in FIG. 9), and the bent portion is then bent back upon itself through 180° about a bend line 612f. The resulting structure has a first plate 612 formed from a lower sub-plate 612e and an upper sub-plate 612d that has approximately twice the length of the lower sub-plate 612e.

As with the lead plates of other embodiments described herein, the lead plate 610 may be used in combination with lead plates having different configurations or as one of a matching pair. The first plate 612 may be coupled to the protection circuit module 200 using a soldering process, as with the other embodiments described above.

Some exemplary embodiments have been described herein, and although specific terms are employed, they are used and are to be interpreted in a generic and descriptive sense only and not for purposes of limitation. Accordingly, it will be understood by those of ordinary skill in the art that various changes in form and details may be made without departing from the spirit and scope of the present invention as set forth in the following claims.

What is claimed is:

1. A battery pack comprising:
a bare cell comprising:
an electrode assembly;
a can containing the electrode assembly and having an opening at an end thereof for receiving the electrode assembly; and
a cap plate comprising a metal plate sealing the opening;
a protection circuit module for protecting the bare cell during charging; and
a lead plate press-fit coupled to the cap plate and electrically and mechanically connecting the cap plate to the protection circuit module,
wherein the metal plate of the cap plate comprises an outer surface facing the protection circuit module and a recess on the outer surface, and a portion of the lead plate having a cross-sectional shape is inserted in and press-fit coupled to the recess having a cross-sectional shape corresponding to the cross-sectional shape of the portion of the lead plate such that the lead plate is maintained in the recess by a frictional force and is electrically and mechanically connected to the metal plate of the cap plate around a perimeter of the recess,
wherein the lead plate comprises a first plate coupled to the protection circuit module and a second plate coupled to the cap plate, and
wherein an end portion of the second plate is inserted in and press-fit coupled to the recess.

2. The battery pack of claim 1, wherein the first plate is substantially perpendicular to the second plate.

3. The battery pack of claim 2, wherein the lead plate is L-shaped.

4. The battery pack of claim 2, wherein the lead plate is T-shaped.

5. The battery pack of claim 1, wherein a portion of the cap plate adjacent the recess is welded to the second plate.

6. The battery pack of claim 5, wherein a portion of the cap plate adjacent the recess is resistance welded or seam welded to the second plate such that the portion of the cap plate adjacent the recess or a portion of the second plate is melted and fills a gap between the end portion of the second plate and the cap plate in the recess.

7. The battery pack of claim 1, wherein the end portion of the second plate is coupled to the cap plate at the recess via a conductive material.

8. The battery pack of claim 7, wherein the conductive material comprises an adhesive.

9. The battery pack of claim 1, wherein the first plate is soldered to the protection circuit module.

10. The battery pack of claim 1, wherein the lead plate is press-fit coupled to a first side of the cap plate, and the battery pack further comprises another lead plate press-fit coupled to a second side of the cap plate and connecting the bare cell to the protection circuit module, the second side of the cap plate being distal from the first side.

11. The battery pack of claim 10, wherein the cap plate has another recess on the outer surface at the second side, and the another lead plate is press-fit coupled to the another recess.

12. The battery pack of claim 10, wherein the lead plate and the another lead plate are positive electrode lead plates.

13. The battery pack of claim 10, wherein the lead plate is a positive electrode lead plate and the another lead plate is a dummy lead plate.

14. The battery pack of claim 1, wherein the bare cell further comprises an electrode terminal protruding through an aperture in the cap plate and electrically connecting the electrode assembly to the protection circuit module.

15. A method of manufacturing a battery pack having a bare cell having an electrode assembly and a can containing the electrode assembly and having an opening at an end thereof for receiving the electrode assembly, the method comprising:
sealing the opening of the can with a cap plate comprising a metal plate; and electrically and mechanically connecting a protection circuit module to the cap plate for protecting the bare cell during charging by press-fit coupling a lead plate to the cap plate, wherein electrically and mechanically connecting the protection circuit module to the cap plate comprises inserting a portion of the lead plate having a cross-sectional shape in a recess having a cross-sectional shape corresponding to the cross-sectional shape of the portion of the lead plate on an outer surface of the metal plate of the cap plate facing the protection circuit module and press-fit coupling the portion of the lead plate to the recess such that the lead plate is maintained in the recess by a frictional force and is electrically and mechanically connected to the metal plate of the cap plate around a perimeter of the recess.

16. The method of claim 15, wherein electrically and mechanically connecting the protection circuit module to the cap plate further comprises soldering a first plate of the lead plate to the protection circuit module, and the portion of the lead plate press-fit coupled to the recess comprises an end portion of a second plate of the lead plate.

17. The method of claim 16, wherein electrically and mechanically connecting the protection circuit module to the cap plate further comprises resistance welding or seam welding a portion of the cap plate adjacent the recess to the second plate such that the portion of the cap plate adjacent the recess or a portion of the second plate is melted and fills a gap between the end portion of the second plate and the cap plate in the recess.

18. The method of claim 15, further comprising applying a conductive adhesive to the portion of the lead plate that is press-fit coupled to the cap plate.

* * * * *